United States Patent
Ni et al.

(10) Patent No.: US 11,893,384 B2
(45) Date of Patent: Feb. 6, 2024

(54) REFACTORING AND/OR REARCHITECTING SOURCE CODE USING MACHINE LEARNING

(71) Applicant: Google LLC, Mountain View, CA (US)

(72) Inventors: Bin Ni, Fremont, CA (US); Joshua Howland, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/668,974

(22) Filed: Feb. 10, 2022

(65) Prior Publication Data
US 2023/0251856 A1    Aug. 10, 2023

(51) Int. Cl.
G06F 8/72    (2018.01)
G06N 3/10    (2006.01)

(52) U.S. Cl.
CPC .................. G06F 8/72 (2013.01); G06N 3/10 (2013.01)

(58) Field of Classification Search
CPC .................. G06F 8/72; G06N 3/10
See application file for complete search history.

(56) References Cited

U.S. PATENT DOCUMENTS

| | | | |
|---|---|---|---|
| 10,846,083 B2 | 11/2020 | Hu | |
| 10,853,060 B2 | 12/2020 | Kimball et al. | |
| 11,042,369 B1 * | 6/2021 | Kimball | G06F 9/4843 |
| 2014/0165035 A1 * | 6/2014 | Campbell | G06F 8/72 |
| | | | 717/121 |
| 2018/0136912 A1 * | 5/2018 | Venkataramani | G06N 3/048 |
| 2022/0121431 A1 * | 4/2022 | Capellman | G06F 8/427 |
| 2022/0124310 A1 * | 4/2022 | Kang | H04N 19/52 |

OTHER PUBLICATIONS

Meng et al., "WCET optimization strategy based on source code refactoring" (Year: 2019).*
Lokuciejewski et al., "Automatic WCET Reduction by Machine Learning Based Heuristics for Function Inlining" (Year: 2009).*
Ahmed et al., "Finding Inlined Functions in Optimized Binaries" (Year: 2021).*
"Extract Method" IntelliJ IDEA. dated Nov. 22, 2021, 4 pages.
"Inline" IntelliJ IDEA, dated Nov. 30, 2021, 6 pages.
"Extract into class refactorings" IntelliJ IDEA, dated Aug. 26, 2021, 5 pages.
Sharma et al., "A Survey on Machine Learning Techniques for Source Code Analysis" arxiv:2110.09610v1 [cs.SE] dated Oct. 18, 2021.

(Continued)

*Primary Examiner* — Phillip H Nguyen
(74) *Attorney, Agent, or Firm* — Gray Ice Higdon (57) ABSTRACT

Implementations are described herein for leveraging machine learning to automate source code refactoring and/or rearchitecting. In various implementations, one or more ground truth boundaries may be removed from one or more boundaried source code files to produce one or more boundary-less source code files. One or more of the boundary-less source code files may be processed using a machine learning model to predict one or more candidate boundaries for reintroduction into the one or more boundary-less source code files. The one or more ground truth boundaries may be compared with the one or more predicted candidate boundaries. The machine learning model may be trained based on the comparing.

19 Claims, 7 Drawing Sheets

(56) References Cited

OTHER PUBLICATIONS

Van der Laij, "Data-Driven Extract Method Recommendations: A Study at ING" arXiv:2107.05396v2 [cs.SE] dated Jul. 22, 2021, 11 pages.
Mohan et al., "A survey of search-based refactoring for software maintenance" Journal of Software Engineering Research and Devleopment. 2018. DOI 10.1186/s40411-018-0046-4. 52 pages.
Rana Kareem Talib Al-Rubaye "API Recommendation Using Domain And Source Code Knowledge" Rochester Institute of Technology. Apr. 2021. 61 pages.
Kim et al., "Automatic Inference of Structural Changes for Matching Across Program Versions" University of Washington. 10 pages.
Dagenais et al., "Recommending Adaptive Changes for Framework Evolution" McGill University, 10 pages.
Zhong et al., "MAPO: Mining and Recommending API Usage Patterns" 25 pages.
Aniche et al., "The Effectiveness of Supervised Machine Learning Algorithms in Predicting Software Refactoring" arXiv:2001.03338v3 [cs.SE] dated Sep. 11, 2020, 19 pages.

* cited by examiner

REFACTORING AND/OR REARCHITECTING SOURCE CODE USING MACHINE LEARNING

BACKGROUND

Source code refactoring and rearchitecting are closely-related processes in which the structure of source code is modified while maintaining its external behavior. "Refactoring" sometimes refers to making relatively granular changes of source code for purposes such as code readability, bug fixing, complexity reduction, improving code maintainability, etc. "Rearchitecting" is similar to refactoring except that it often refers to higher-level or less granular refactoring.

Source code may be refactored/rearchitected for a variety of reasons. High traffic may dictate that source code be migrated to a cloud-based infrastructure. Code bases may accumulate technical debt over time; refactoring and/or rearchitecting may cure this technical debt. Relatively large and/or multi-functional portions of source code may be broken up and/or segmented into multiple services, sometimes referred to as "microservices" or microservice application programming interfaces (APIs). However, refactoring and/or rearchitecting may be cumbersome and/or expensive. Large teams of programmers and/or software architects may be required to spend many months or years refactoring and/or rearchitecting a large legacy code base.

SUMMARY

Implementations are described herein for leveraging machine learning to automate aspects of source code refactoring and/or rearchitecting. More particularly, but not exclusively, implementations are described herein for training machine learning model(s) to "learn" to predict what will be referred to herein as "boundaries" for incorporation into source code. As used herein, a source code "boundary" may refer to a logical and/or syntactic barrier in the source code that separates or otherwise delineates functionally-distinct lines of source code. One example of a source code boundary is a function that separates lines of source code forming the function from other lines of source code that may "call" or otherwise rely upon the function. Other examples of source code boundaries include, but are not limited to, APIs (including microservices), generics such as preprocessor macros or template function calls, classes, objects, and so forth.

In some implementations, a method implemented using one or more processors may include: removing one or more ground truth boundaries from one or more boundaried source code files to produce one or more boundary-less source code files; processing one or more of the boundary-less source code files using a machine learning model to predict one or more candidate boundaries for reintroduction into the one or more boundary-less source code files; comparing the one or more ground truth boundaries with the one or more predicted candidate boundaries; and training the machine learning model based on the comparing.

In various implementations, the removing may include inlining one or more shorthand source code snippets contained in one or more of the boundaried source code files to generate one or more longhand source code snippets. In various implementations, the one or more predicted candidate boundaries may include a candidate microservice application programming interface (API) to replace one or more of the longhand source code snippets. In various implementations, the one or more shorthand source code snippets may include a function call, a preprocessor macro, or a template function call. In various implementations, the one or more predicted candidate boundaries may include, as a replacement of one or more of the longhand source code snippets, a candidate function call, a candidate preprocessor macro, or a candidate template function call.

In various implementations, the method may include executing a binary compiled from one or more original source codes file to generate one or more execution traces; based on one or more of the execution traces, identifying lines of one or more of the original source code files that are suitable for synthetic boundary creation; and replacing the lines that are suitable for boundary creation with, as one or more of the ground truth boundaries, one or more synthetic boundaries to create one or more of the boundaried source code files.

In some implementations, the machine learning model may be a transformer machine learning model. In other implementations, the method may include generating a graph from one or more of the boundary-less source code files, and the processing may include processing the graph using a graph neural network.

In another aspect, a method for predicting boundaries for incorporation into source code may include processing one or more boundary-deficient source code files using the aforementioned machine learning model to predict one or more candidate boundaries for introduction into the one or more boundary-deficient source code files.

In another aspect, a method for predicting one or more candidate boundaries for incorporation into source code may include: processing one or more boundary-deficient source code files using a machine learning model to predict the one or more candidate boundaries for introduction into the one or more boundary-deficient source code files. In various implementations, the machine learning model may take the form of an encoder-decoder model that was trained previously using training examples comprising source code with boundaries removed, wherein the removed boundaries were used during training as labels to minimize an error associated with the encoder-decoder model. In various implementations, the method may include providing output indicative of one or more of the predicted candidate boundaries.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for leveraging machine learning to automate aspects of source code refactoring and/or rearchitecting. More particularly, but not exclusively, implementations are described herein for training machine learning model(s) to "learn" to predict what will be referred to herein as "boundaries" for incorporation into source code. As used herein, a source code "boundary" may refer to a logical and/or syntactic barrier in the source code that separates or otherwise delineates functionally-distinct lines of source code. One example of a source code boundary is a function that separates lines of source code forming the function from other lines of source code that may "call" or otherwise rely upon the function. Other examples of source code boundaries include, but are not limited to, APIs (including microservices), generics such as preprocessor macros or template function calls, classes, objects, and so forth.

Machine learning model(s) trained to predict these source code boundaries may take various forms. In some implementations, the machine learning model(s) may include a sequence-to-sequence model that can process source code tokens directly, such as a BERT transformer (Bidirectional Encoder Representations from Transformers), recurrent neural network (RNN), long short-term memory (LSTM) network, gated recurrent unit (GRU) network, and so forth. In other implementations, the machine learning may be designed to process graph data, such as an abstract syntax tree (AST) or control flow graph (CFG) generated from source code, and may take the form of a graph neural network (GNN) or a graph convolutional network (GCN), to name a few.

In some implementations, the machine learning model may be trained as follows. A source code file that includes "ground truth" boundaries (a "boundaried" source code file) such as function calls or separable APIs (e.g., for distinct microservices) may be provided, e.g., by a party that wishes to refactor a source codebase. The boundaries may be removed from the boundaried source code file in a process referred to herein as "flattening" the boundaried source code file. The resulting boundary-less source code file may be processed using the machine learning model to generate output (e.g., source code snippets, edit recommendations) indicative of one or more predicted candidate boundaries. These predicted candidate boundaries may be compared to the ground truth boundaries (acting as labels) to determine an error. Based on this error, the machine learning model may be trained using techniques such as gradient descent, back propagation, etc.

Boundaries may be removed from a boundaried source code file in various ways. In some implementations, "inlining" may be performed to replace what will be referred to herein as "shorthand" source code snippets such as function calls (template or otherwise) with what will be referred to herein as "longhand" source code, e.g., the underlying function code.

Alternatively, in some implementations, boundaries can be added to an original source code file to create the boundaried source code file. The original boundary-deficient source code file can be preserved as the boundary-less source code file. As an example, an original source code file that is "boundary-deficient"—without boundaries or with less boundaries than would be optimal—can be compiled and executed using various different inputs to generate execution traces. These execution traces may identify which lines of the source code file were executed, how often or frequently those lines were executed, etc. Based on these execution traces, lines of the original source code file that are suitable for "synthetic" (i.e. created automatically, rather than by a human) boundary creation (e.g., suitable for inclusion in a function or as a standalone microservice API) may be identified and replaced with corresponding synthetic boundaries. These synthetic boundaries may then serve as the aforementioned "ground truth" boundaries (and hence, training labels) described previously. In some implementations, the original boundary-deficient source code may be processed using the same machine learning model described previously to predict candidate boundary predictions. To the extent these predicted candidate boundary predictions differ from the synthetic boundaries, the machine learning model may be trained.

In sum, the machine learning model may be trained to "learn" mappings between boundary-deficient source code and boundaried source code. The boundaried source code may be human-composed and/or generated synthetically. By training the machine learning model to learn mappings between boundary-deficient source code and human-composed boundaried source code, the machine learning model is able to predict boundaries that resemble the type of refactoring that human programmers would perform. Contrastly, by training the machine learning model to learn mappings between boundary-deficient source code and synthetically-generated boundaried source code, the machine learning model is able to predict boundaries that may not necessarily resemble human-engineered refactoring, but nonetheless may improve the source code. In many implementations, the machine learning model may be trained in both ways to be more robust.

Once the machine learning model is sufficiently trained, it may be used for a variety of purposes. In some implementations, boundary-less or boundary-deficient source code may be processed using the machine learning model to generate candidate boundaries that can be recommended to a programmer and/or automatically used to replace line(s) of the source code. In other implementations, source code to which boundaries were manually added by a programmer may be processed using the machine learning model. Based on this processing, alternative candidate boundaries may be recommended, and/or the manually-added boundaries may be assigned quality metrics.

Figure 1:
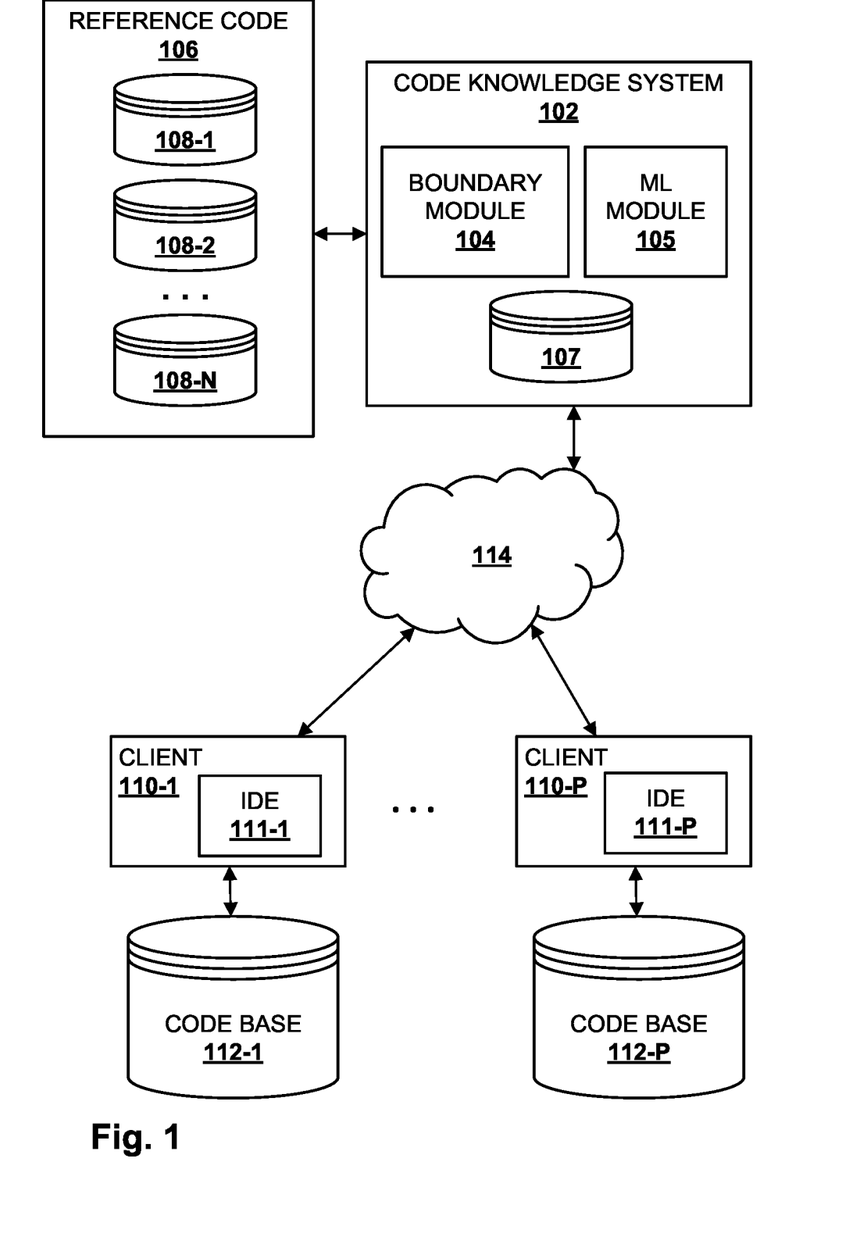
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations.

Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be operably coupled with clients 110-1 to 110-P via one or more computer networks (114) to help clients 110-1 to 110-P manage their respective code bases 112-1 to 112-P. In other implementations, code knowledge system 102 may be implemented locally at a client 110. Code knowledge system 102 may include, among other things, a boundary module 104 and a machine learning ("ML") module 105 that are configured to perform selected aspects of the present disclosure in order to help one or more clients 110-1 to 110-P to refactor, rearchitect, migrate, or otherwise act upon one or more corresponding code bases 112-1 to 112-P.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Boundary module 104 and/or ML module 105 may be configured to leverage reference code 106 to aid clients 110-1 to 110-P in refactoring, rearchitecting, migrating, or otherwise acting upon their code bases 112-1 to 112-P. In some implementations, reference code 106 may include multiple different corpuses 108-1 to 108-N of source code that can be leveraged in this manner. These corpuses 108-1 to 108-N may be publicly available, proprietary, stored on a cloud, stored in a version control system (VCS), and so forth. In some examples, one or more corpuses 108 of reference code 106 may include source code that includes various boundaries in various forms. Based on analysis of this source code, boundary module 104 and ML module 105 may cooperate to train one or more machine learning models stored in a machine learning model database 107 to "learn" to predict boundaries for incorporation into source code.

In some implementations, each client 110 may include an integrated development environment (IDE) 111 that can be used to edit/write source code. In other implementations, other applications may be used to edit source code, such as a simple text editor, a word processing application, a source code editor application with specific functionality to aid in computer programming, etc. Whether a programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality (e.g., tools) specifically designed to ease programming tasks, such as refactoring, rearchitecting, migrating, a compiler, real time syntax checking, etc. In some implementations, techniques described herein may enhance aspects of this extra functionality provided by a source code editor (whether a stand-alone application or part of an IDE), e.g., by generating and/or recommending boundaries for incorporation into source code based on various signals, such as edits being made by a user currently, a particular file the user is editing, etc.

As mentioned previously, ML module 105 may have access to data indicative of one or more trained machine learning models (not depicted) in database 107. These trained machine learning models may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network ("RNN", e.g., long short-term memory, or "LSTM", gate recurrent units, or "GRU", etc.), or a transformer network, a random forest, and/or any other type of machine learning model that may be applied to facilitate selected aspects of the present disclosure.

Figure 2:
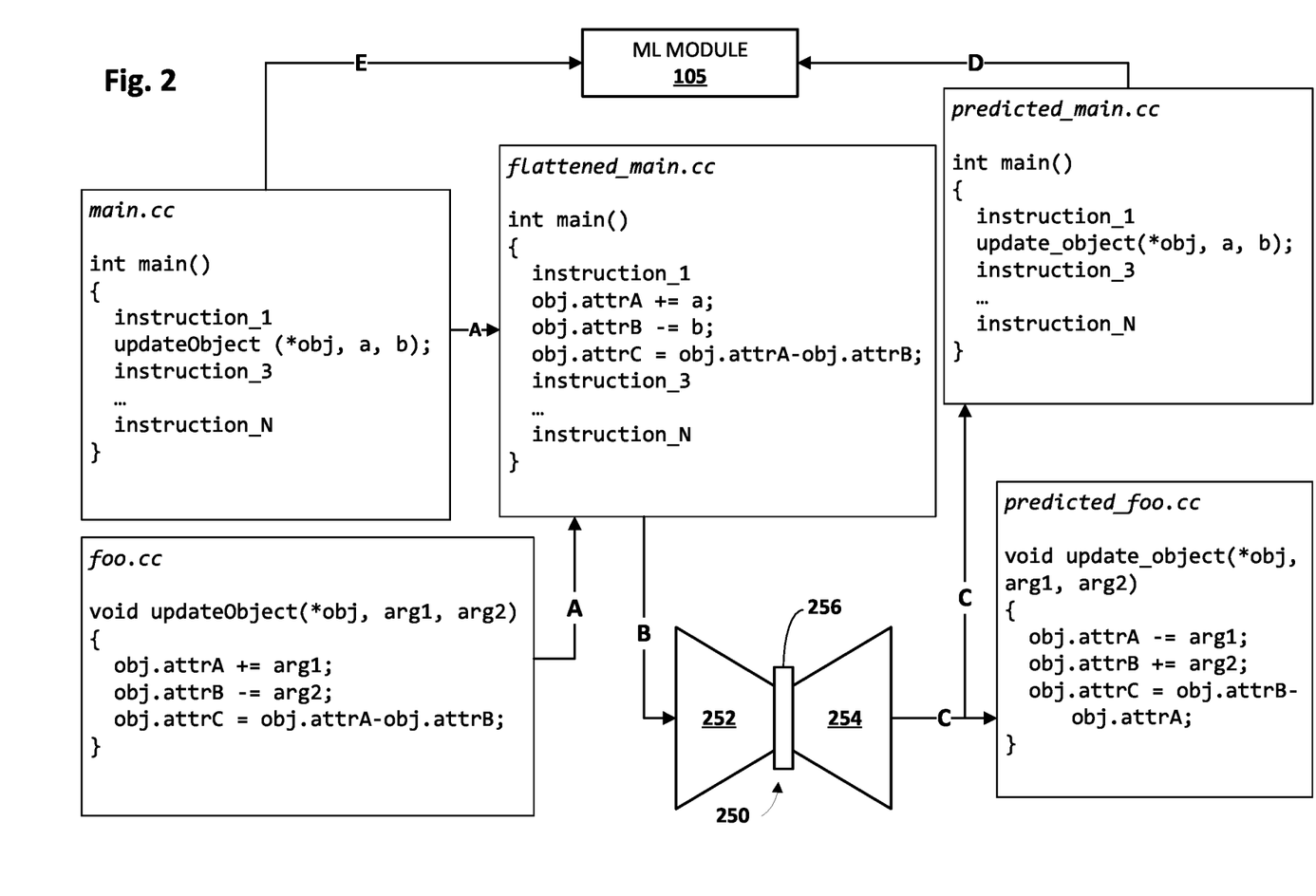
FIG. 2 schematically demonstrates an example of how aspects of the present disclosure may be implemented, in accordance with various implementations.

FIG. 2 schematically depicts an example of how a machine learning model 250 may be trained to predict candidate boundaries for incorporation into source code, in accordance with various implementations. In FIG. 2, two pieces (e.g., excerpts, portions, whole files) of source code, main.cc and foo.cc, are depicted. The main.cc source code, which includes a function call updateObject( ), can be compiled into an executable program. The foo.cc source code defines the updateObject( ) function that is called by main.cc. The function call and separately-defined function are examples of source code boundaries. Thus, main.cc and foo.cc may be considered "boundaried" source code files.

At arrows A, main.cc and foo.cc may be processed, e.g., by boundary module 104 (not depicted in FIG. 2, see FIG. 1), to generate a "flattened" source code, flattened_main.cc. In flattened_main.cc, the function call updateObject( ), which may be considered a shorthand source code snippet, has been replaced with a longhand source code snippet, namely, the lines of the updateObject( ) function defined separately in foo.cc, in a process referred to as "inlining" Because the boundaries that were present in main.cc and foo.cc have been removed, flattened_main.cc does not include boundaries, and therefore may be considered "boundary-less" or, more generally, "boundary-deficient."

ML module 105 may then process flattened_main.cc using machine learning model 250 to predict one or more candidate boundaries. In FIG. 2, machine learning model 250 takes the form of an encoder-decoder network (sometimes referred to as an "autoencoder") that includes an encoder portion 252 and a decoder portion 254, either of which may take various forms, such as neural networks, GNNs, sequence-to-sequence models (e.g., transformers, RNNs, LSTMs, GRUs), etc.

When ML module 105 processes flattened_main.cc using encoder portion 252 at arrow B, the intermediate representation 256 that results may take the form of, for instance, a semantically-rich feature vector, feature embedding, latent space embedding, etc. In implementations in which machine learning model 250, or a portion thereof (e.g., 252, 254) takes the form of a graph neural network, ML module 105 or another component may first generate a graph that represents main.cc and/or foo.cc. Such a graph may take various forms, such as an AST or CFG, to name a few. This graph may then be processed by encoder portion 252, which may be a GNN, for instance, to generate intermediate representation 256. In other implementations in which machine learning model 250 is a sequence-to-sequence model, there may be no need to generate a graph.

At arrow C, ML module 105 may process this intermediate representation 256 based on decoder portion 254 to generate, for instance, new boundaried source code, namely, predicted_main.cc and predicted_foo.cc. If decoder portion 254 is a graph-based machine learning model such as a GNN, then in some such implementations, the output generated based on decoder portion 254 may be, for instance, a predicted graph such as an AST or CFG. Such a graph may be converted into source code using known techniques, such as one or more components of a compiler or decompiler.

In both predicted_main.cc and predicted_foo.cc, the predicted function name was "update_object," rather than the original function name, "updateObject." This syntactic difference constitutes an error between the prediction and the "ground truth" boundaries of main.cc and foo.cc that can be used, e.g., by ML module 105, to train machine learning model 250, e.g., using techniques such as back propagation and gradient descent. In addition, predicted_foo.cc differs from foo.cc in other ways, such as various instances in which the operands and arguments are transposed. These may constitute additional syntactic and/or semantic errors that may be used to train machine learning model 250.

In various implementations, ML module 105 may use numerous additional instances of boundaried source code (e.g., code with "ground truth" boundaries) to train machine learning model 250 further. For example, numerous public repositories (e.g., 108-1 to 108-N) of source code, in many cases open source, are freely-available for use by developers. Numerous instances of boundaried source code from these repositories may be processed as illustrated in FIG. 2 to remove boundaries, then attempt to predict the same boundaries using machine learning model 250, and train machine learning model 250 using the removed boundaries as labels to determine errors. Once machine learning model 250 is usable to predict source code boundaries at some threshold level of accuracy and/or precision, it may be used during inference, e.g., by ML module 105, to predict source code boundaries for unlabeled and/or boundary-deficient source code.

Training of machine learning model 250 is not limited to the use of source code with static, human-engineered boundaries. In various implementations, boundary-deficient source code may be processed to automatically generate what will be referred to herein as "synthetic" source code boundaries. In some implementations, synthetic source code boundaries may be generated to replace source code that is executed together frequently and therefore may be suitable for refactoring. These synthetic source code boundaries may be used, for instance, as synthetic training data that can be used by ML module 105 to train machine learning model 250. For example, the synthetic boundaries may be treated as ground truth boundaries or labels that machine learning model 250 can be used to attempt to recreate/predict, as demonstrated in FIG. 2.

Figure 3:
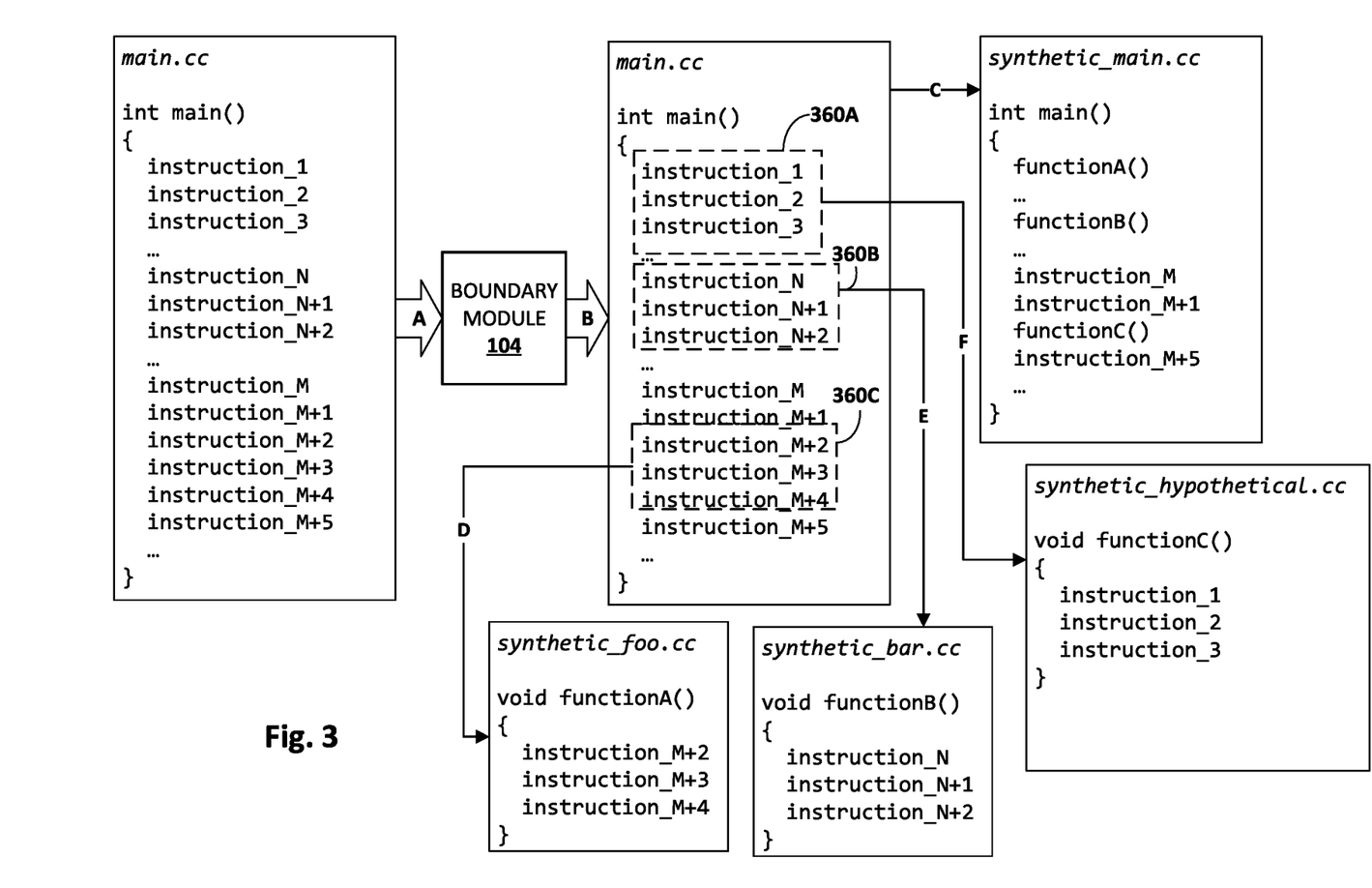
FIG. 3 schematically demonstrates another example of how aspects of the present disclosure may be implemented, in accordance with various implementations.

FIG. 3 schematically depicts one example of how synthetic boundaries may be incorporated into source code main.cc. Source code main.cc in FIG. 3 is boundary-deficient in that it simply includes a sequence of instructions (instruction_1, instruction_2, . . . instruction_M+5, . . . ). Each line of main.cc in FIG. 3 may include various forms of instructions, such as logical statements (e.g., branches, loops, Boolean statements, etc.), operations on variables, variable declarations, and so forth.

At arrow A, boundary module 104 may process main.cc to identify, at arrow B, line(s) of main.cc that are suitable for synthetic boundary creation. In some implementations, this may involve compiling main.cc, executing the resulting binary multiple times using different inputs (e.g., boundary cases), and analyzing the resulting execution traces to identify which lines were executed most frequently and/or together. For example, lines of code within an if statement may be executed numerous times. In FIG. 3, the lines identified as suitable for boundary creation are annotated at 360A, 360B, and 360C.

Next, boundary module 104 may replace the lines of main.cc that are suitable for boundary creation with, e.g., as one or more of the ground truth boundaries described previously, one or more synthetic boundaries to create boundaried source code file(s). In FIG. 3, for instance, main.cc is segmented into four files (in no particular order). At arrow C, synthetic_main.cc is created that can be compiled into a standalone executable and has several lines replaced with function calls. At arrow D, synthetic_foo.cc is created to define a first function (or microservice API, etc.), functionA( ), that replaces the lines of main.cc that are annotated with 360C. At arrow E, synthetic_bar.cc is created to define a second function (or microservice API, etc.), functionB( ), that replaces the lines of main.cc annotated with 360B. And at arrow F, synthetic_hypothetical.cc is created to define a third function (or microservice API, etc.), functionC( ), that replaces the lines of main.cc annotated with 360A.

In some implementations, the newly-boundaried source code files depicted on the right-hand side of FIG. 3 may be used as training data to train machine learning model 250. In particular, the synthetic boundaries added in FIG. 3 may be treated as ground truth boundaries—and hence, labels—that can be compared to predicted candidate boundaries as described previously to determine error and ultimately train machine learning model 250. An example of this can be understood in reference to FIG. 4.

Figure 4:
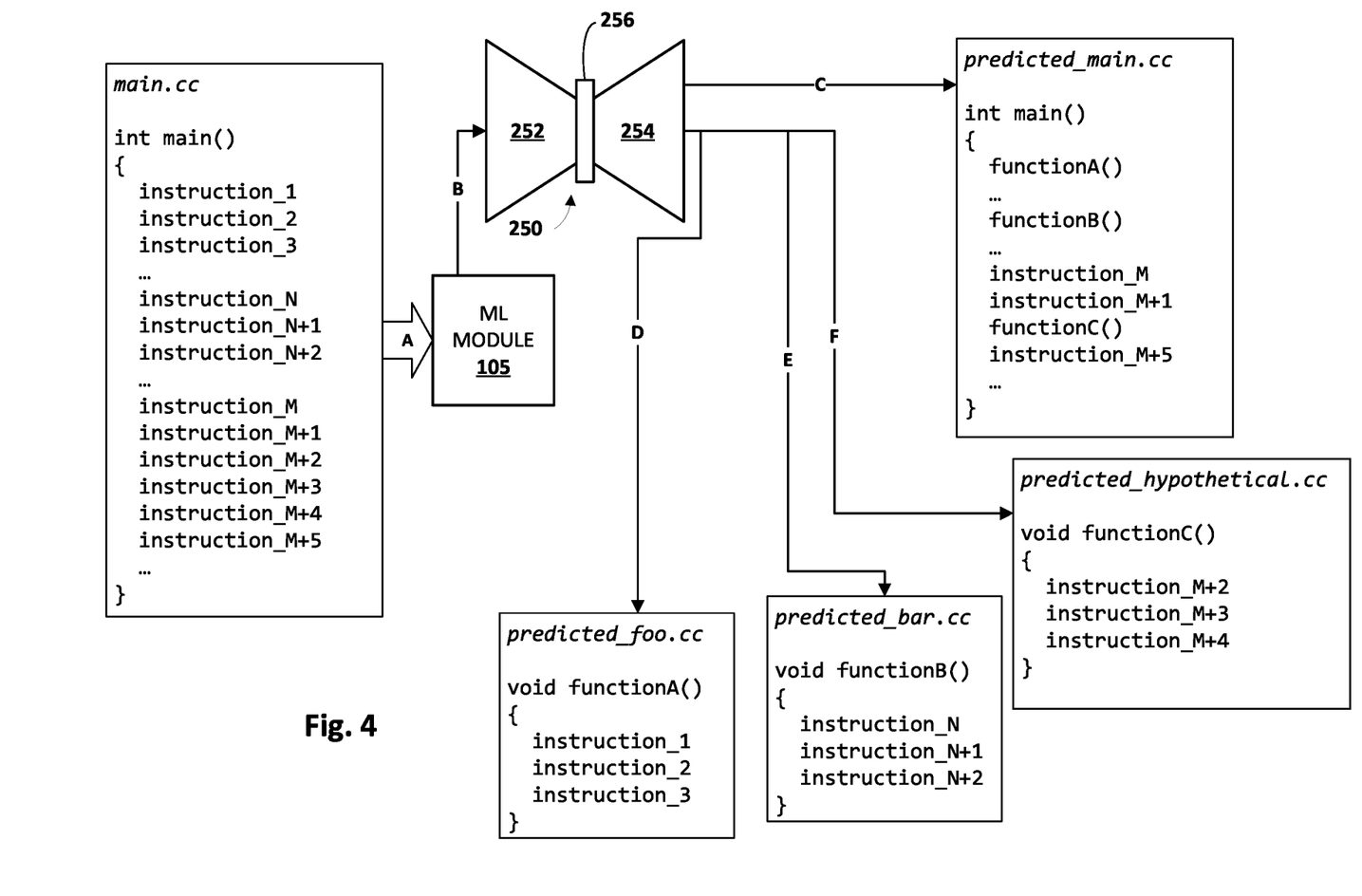
FIG. 4 schematically demonstrates another example of how aspects of the present disclosure may be implemented, in accordance with various implementations.

Starting on the left in FIG. 4, main.cc may be retrieved at arrow A in its original boundary-deficient form. This boundary-less main.cc may be processed at arrow B using machine learning model 250, e.g., by being applied as input across encoder portion 252 to generate intermediate representation 256. Intermediate representation 256 may be applied by ML module 105 across decoder portion 254 to predict candidate boundaries at arrows C-F (in no particular order).

At arrow C, a predicted_main.cc is predicted that includes function calls functionA( ), functionB( ), and function( ) in place of various lines of code. At arrow D, predicted_foo.cc is predicted to define functionA( ) to include instruction_1 through instruction_3 of main.cc. At arrow E, predicted_bar.cc is predicted to define functionB( ) to include instruction_N through instruction_N+2 of main.cc. At arrow F, predicted_hypothetical.cc is predicted to define functionC( ) to include instruction_M+2 through instruction_M+4 of main.cc. During training, differences between these predicted candidate boundaries and the synthetically-boundaried source code files on the right-hand side of FIG. 3—namely, synthetic_main.cc, synthetic_foo.cc, synthetic_bar.cc, and synthetic_hypothetical.cc—may be considered error that can be used, e.g., by ML module 105, to train machine learning model 250. For example, instructions in predicted_foo.cc are different from synthetic_foo.cc. Likewise, instructions in predicted_hypothetical.cc are different from synthetic_hypothetical.cc.

FIG. 4 is not limited to depicting the training phase of machine learning model 250. Suppose machine learning model 250 is instead assumed to be fully trained, and main.cc on the left-hand side of FIG. 4 is considered boundary-deficient source code that is to be improved using techniques described herein. In such case, FIG. 4 simply depicts the inference phase of machine learning model 250, where main.cc is replaced, recommended to be replaced with, altered to conform to, or recommended to be altered to conform to, predicted_main.cc, predicted_foo.cc, bar.cc, and predicted_hypothetical.cc.

Figure 5A:
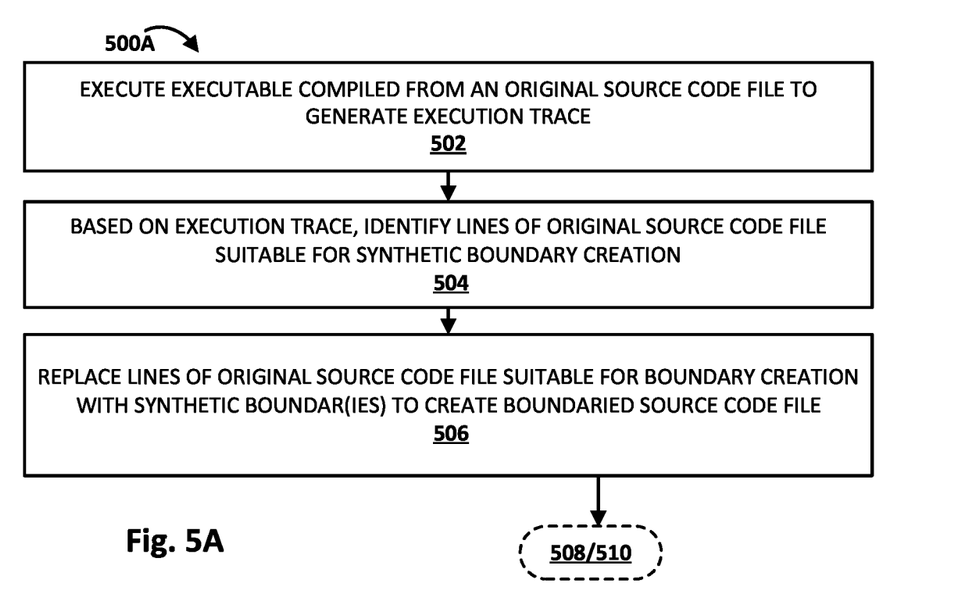
FIG. 5A and FIG. 5B depict flow charts illustrating example methods for practicing selected aspects of the present disclosure.

FIG. 5A is a flowchart illustrating an example method 500A of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 500A are shown in a particular order, this is not meant to be limiting. One or more operations may be reordered, omitted or added.

At block 502, the system, e.g., by way of boundary module 104, may execute an executable at least partially compiled from an original source code file to generate an execution trace. The executable may be a fully-compiled binary or machine code. Alternatively, for source code such as Java, the executable may be bytecode that is executable within a virtual machine. In other embodiments, the executable may be interpretable code that can be interpreted without being wholly compiled up front, e.g., using just-in-time compilation.

Based on the execution trace generated at block 502, at block 504, the system, e.g., by way of boundary module 104, may identify lines or instructions of source code that are suitable for synthetic boundary creation. For example, the execution trace may take various forms, and may identify, or be usable to identify, lines/instructions of the original source code file that were executed, as well as lines/instructions that weren't. In some implementations, the executable may be executed multiple times, each time with different input(s) or states as starting points. The resulting execution traces may be usable to identify lines/instructions of the original source code file that were executed in each instance, as well as lines/instructions that weren't.

Statistics about these executed lines/instructions may then be calculated. Lines/instructions that satisfy some threshold or criteria, such as being executed together in some threshold percentage of the execution traces, or some number of times within one or more of the execution traces, may be identified as suitable for creation of synthetic boundaries (e.g., as a separately-defined function). Intuitively, instructions that are executed together frequently may be more efficiently stored in memory as a separate function or API that can be linked to and/or called.

At block 506, the system, e.g., by way of boundary module 104, may replace lines of the original source code file that were identified at block 504 as suitable for synthetic boundary creation with synthetic boundaries to create one or more boundaried source code files. Examples of this were depicted in FIG. 3. The instructions identified by annotation 360A, instruction_1 to instruction_3, were imported into a separately-defined functionC( ) and replaced in synthetic_main.cc with the function call functionC( ). The instructions identified by annotation 360B, instruction_N to instruction_N+2, were imported into a separately-defined functionB( ) and replaced in synthetic_main.cc with the function call functionB( ). The instructions identified by annotation 360C, instruction_M+2 to instruction_M+4, were imported into a separately-defined functionA( ) and replaced in synthetic_main.cc with the function call functionA( ).

Figure 5B:
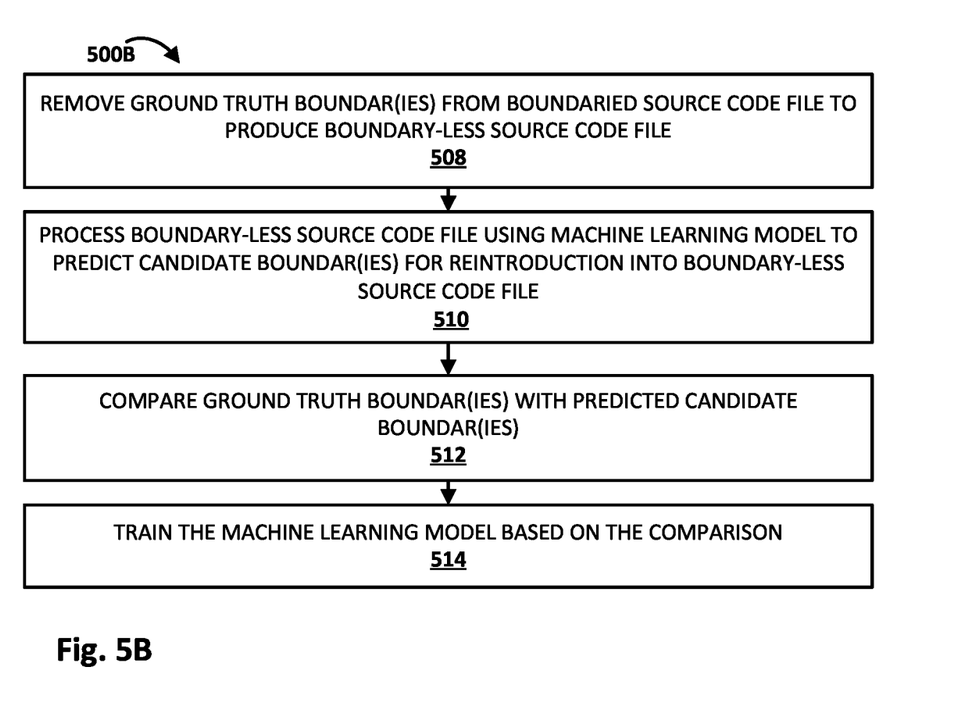

Once the one or more boundaried source code files are created, they may be used for different purposes. One such purpose is to train machine learning model 250, in which case method 500A may proceed to block 508 of method 500B depicted in FIG. 5B. FIG. 5B is a flowchart illustrating the example method 500B of training machine learning model 250. For convenience, the operations of the flow chart are described with reference to a system that performs the operations. This system may include various components of various computer systems, such as one or more components of code knowledge system 102. Moreover, while operations of method 500B are shown in a particular order, this is not meant to be limiting. One or more operations may be reordered, omitted or added.

At block 508, the system, e.g., by way of boundary module 104, may remove one or more ground truth boundaries (e.g., functions, function calls, APIs, microservice APIs, etc.) from one or more boundaried source code files to produce one or more boundary-less (or at least boundary-deficient) source code files. An example of this was depicted in FIG. 2, wherein main.cc and foo.cc were the boundaried source code files, and flattened_main.cc was the boundary-less (or at least boundary-deficient) source code file. If the boundaries are synthetic (i.e. method 500B follows method 500A), then the operations of block 508 may be omitted and the original source code file that was compiled and executed to identify synthetic boundaries may be used as the training data.

At block 510, the system, e.g., by way of ML module 105, may process one or more of the boundary-less source code files using a machine learning model to predict one or more candidate boundaries for reintroduction into the one or more boundary-less source code files. In FIG. 2, for instance, flattened_main.cc was processed by ML module 105 using machine learning model 250 to generate predicted_main.cc and predicted_foo.cc.

At block 512, the system, e.g., by way of ML module 105, may compare the one or more ground truth boundaries (which in some circumstances may be the synthetic boundaries used to replace the original lines of source code at block 506) with the one or more predicted candidate boundaries, e.g., to determine an error. In FIG. 2, for instance, the original function name updateObject was incorrectly predicted as update_object, which constitutes an error. At block 514, the system, e.g., by way of ML module 105, may train machine learning model 250 based on the comparing, e.g., using the error and techniques such as gradient descent, back propagation, etc.

It should be understood that while method 500B can be performed using the boundaried source code file generated at block 506 of FIG. 5A, this is not meant to be limiting. In other implementations, preexisting boundaried source code file may be obtained from other sources, such as publicly-available codebases and repositories (e.g., 108-1 to 108-N), which contain myriad examples of boundaried source code. By replacing these preexisting boundaries (e.g., shorthand source code) automatically and systematically (e.g., using inlining or other similar techniques) with longhand source code, and then attempting to reintroduce/recreate the shorthand source code using machine learning model 250, large amounts of example input-output may be generated automatically to facilitate supervised training with little human effort.

Figure 6:
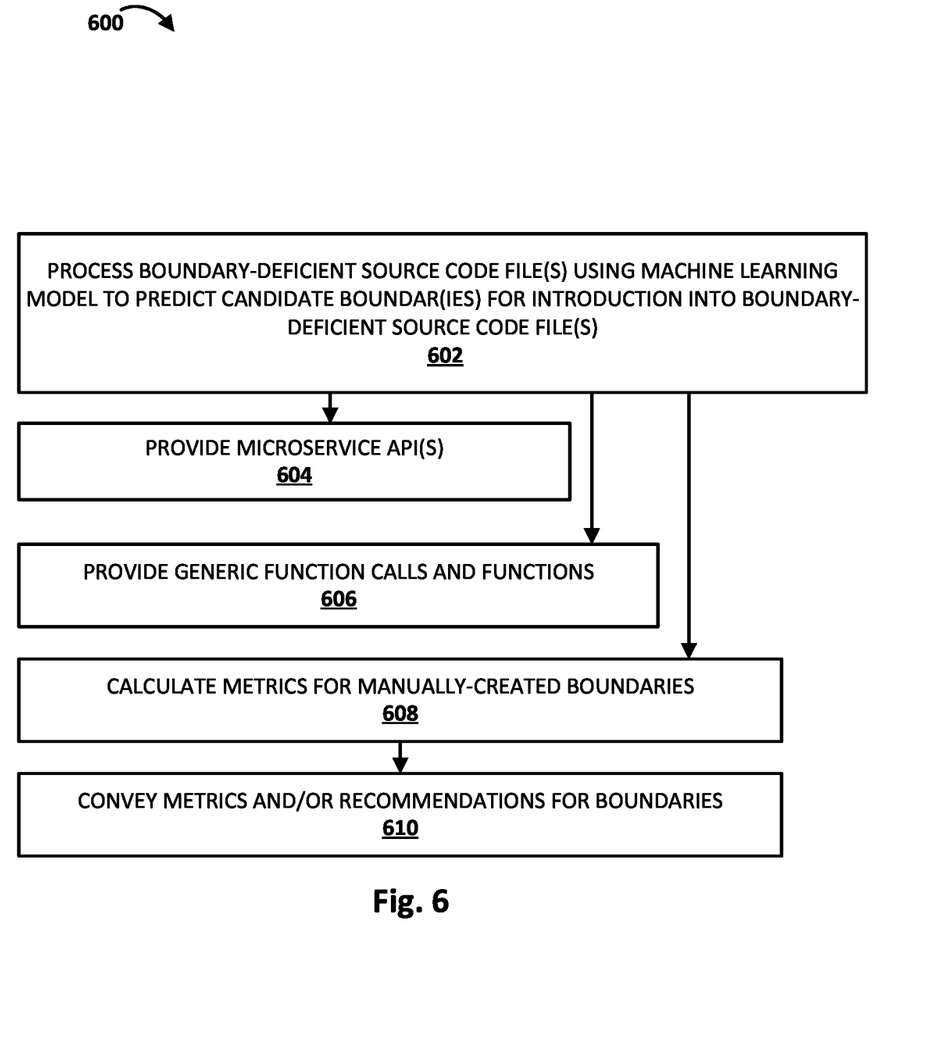
FIG. 6 depicts a flowchart illustrating another example method for practicing selected aspects of the present disclosure.

FIG. 6 is a flowchart illustrating an example method 600 of using a trained machine learning model, such as machine learning model 250, during an inference phase, in accordance with implementations disclosed herein. For convenience, the operations of the flow chart are described with reference to a system that performs the operations. This system may include various components of various computer systems, such as one or more components of code knowledge system 102. Moreover, while operations of method 600 are shown in a particular order, this is not meant to be limiting. One or more operations may be reordered, omitted or added.

At block 602, the system, e.g., by way of ML module 105, may process one or more boundary-deficient source code files using machine learning model 250 to predict one or more candidate boundaries for introduction into the one or more boundary-deficient source code files. In various implementations, the machine learning model may take the form of the encoder-decoder model 250 that was trained previously using training examples. These training examples may include, for instance, source code with boundaries removed. The removed boundaries may have been used during training as labels to minimize an error associated with the encoder-decoder model 250. An example of this was depicted in FIG. 4, where main.cc was processed by ML module 105 using encoder portion 252 to generate intermediate representation 256. Intermediate representation 256 was in turn processed by ML module 105 using decoder portion 254 to predict candidate boundaries in the form of predicted_main.cc, predicted_foo.cc, predicted_bar.cc, and predicted_hypothetical.cc.

Various actions may then be taken depending on factors such as the needs or desires of a programmer/developer/user, the nature of the source code being processed (e.g., microservice, three-layer, object-oriented, programming language used, etc.), and so forth. For example, at block 604, the system may provide one or more microservice APIs based on one or more of the predicted boundaries. Such an API may encapsulate selected portions of the original source code and make it executable, callable, and/or invokable as a standalone microservice. As another option, at block 606, the system may provide generic function calls and/or functions that replace lines and/or instructions of the original source code.

As yet another option, at block 608, the system may calculate metrics for manually-created boundaries, i.e., boundaries inserted by a developer into source code. These metrics may convey a level of quality, score, and/or desirability of the inserted boundaries. For example, a manually-inserted boundary that does not align with, or even conflicts with, a predicted boundary may be assigned a relatively low score. By contrast, a manually-inserted boundary that is closely-aligned with and/or not inconsistent with a predicted boundary may receive a more favorable score. In some implementations, at block 610, these metrics may be conveyed to the user, and/or recommendations may be made to the user based on these metrics. For example, a manually-inserted boundary that received a low score may be recommended for replacement by a boundary predicted using techniques described herein.

Figure 7:
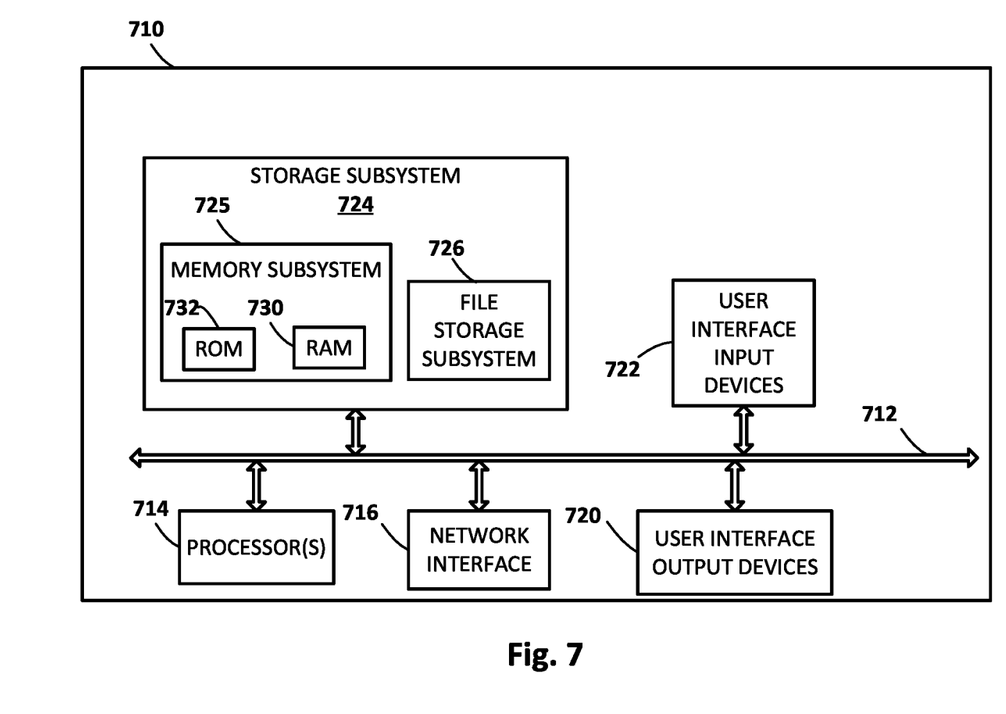
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 5A, 5B, 6, and 7, as well as to implement various components depicted in FIGS. 1-4.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
creating a training set that includes boundaried source code files and corresponding boundary-less source code files, wherein the creating includes removing ground truth boundaries from the boundaried source code files to produce the boundary-less source code files;
processing the training set using a machine learning model to predict candidate boundaries for reintroduction into the boundary-less source code files;
comparing the ground truth boundaries of the boundaried source code files with the predicted candidate boundaries to determine one or more errors; and
training the machine learning model based on the one or more errors to minimize a loss function of the machine learning model.

2. The method of claim 1, wherein the removing comprises inlining one or more shorthand source code snippets contained in one or more of the boundaried source code files to generate one or more longhand source code snippets.

3. The method of claim 2, wherein the one or more predicted candidate boundaries comprise a candidate micro service application programming interface (API) to replace one or more of the longhand source code snippets.

4. The method of claim 2, wherein the one or more shorthand source code snippets include a function call, a preprocessor macro, or a template function call.

5. The method of claim 2, wherein the one or more predicted candidate boundaries comprise, as a replacement of one or more of the longhand source code snippets, a candidate function call, a candidate preprocessor macro, or a candidate template function call.

6. The method of claim 1, further comprising:
executing a binary compiled from one or more original source code files to generate one or more execution traces;
based on one or more of the execution traces, identifying lines of one or more of the original source code files that are suitable for synthetic boundary creation; and
replacing the lines that are suitable for boundary creation with, as one or more of the ground truth boundaries, one or more synthetic boundaries to create one or more of the boundaried source code files.

7. The method of claim 1, wherein the machine learning model comprises a transformer machine learning model.

8. The method of claim 1, wherein the method further comprises generating a graph from one or more of the boundary-less source code files, and the processing includes processing the graph using a graph neural network.

9. A method for predicting one or more candidate boundaries for incorporation into source code, the method implemented using one or more processors and comprising:
processing one or more boundary-deficient source code files using a machine learning model to predict the one or more candidate boundaries for introduction into the one or more boundary-deficient source code files, wherein the machine learning model comprises an encoder-decoder model that was trained previously using training examples comprising source code with boundaries removed, wherein the removed boundaries were used during training of the machine learning model as labels to determine error(s) and wherein the error(s) was used to train the machine learning model to minimize a loss function associated with the encoder-decoder model; and
providing output indicative of one or more of the predicted candidate boundaries.

10. The method of claim 9, wherein the one or more predicted candidate boundaries comprise a candidate function call, a candidate preprocessor macro, or a candidate template function call.

11. The method of claim 9, wherein the encoder-decoder model comprises a transformer machine learning model.

12. The method of claim 9, wherein the method further comprises generating a graph from one or more of the boundary-deficient source code files, and the processing includes processing the graph using a graph neural network as the encoder-decoder model.

13. A system comprising one or more processors and memory storing instructions that, in response to execution of the instructions, cause the one or more processors to:
create a training set that includes boundaried source code files and corresponding boundary-less source code files, wherein the instructions to create include instructions to remove ground truth boundaries from the more boundaried source code files to produce the boundary-less source code files;
process the training set using a machine learning model to predict candidate boundaries for reintroduction into the boundary-less source code files;
compare the ground truth boundaries of the boundaried source code files with the predicted candidate boundaries to determine an error; and
train the machine learning model based on the error to minimize a loss function of the machine learning model.

14. The system of claim 13, wherein the removing comprises inlining one or more shorthand source code snippets contained in one or more of the boundaried source code files to generate one or more longhand source code snippets.

15. The system of claim 14, wherein the one or more predicted candidate boundaries comprise a candidate micro service application programming interface (API) to replace one or more of the longhand source code snippets.

16. The system of claim 14, wherein the one or more shorthand source code snippets include a function call, a preprocessor macro, or a template function call.

17. The system of claim 14, wherein the one or more predicted candidate boundaries comprise, as a replacement of one or more of the longhand source code snippets, a candidate function call, a candidate preprocessor macro, or a candidate template function call.

18. The system of claim 13, further comprising instructions to:
   execute a binary compiled from one or more original source code files to generate one or more execution traces;
   based on one or more of the execution traces, identify lines of one or more of the original source code files that are suitable for synthetic boundary creation; and
   replace the lines that are suitable for boundary creation with, as one or more of the ground truth boundaries, one or more synthetic boundaries to create one or more of the boundaried source code files.

19. The system of claim 13, wherein the machine learning model comprises a transformer machine learning model or a graph neural network.

\* \* \* \* \*